UNITED STATES PATENT OFFICE.

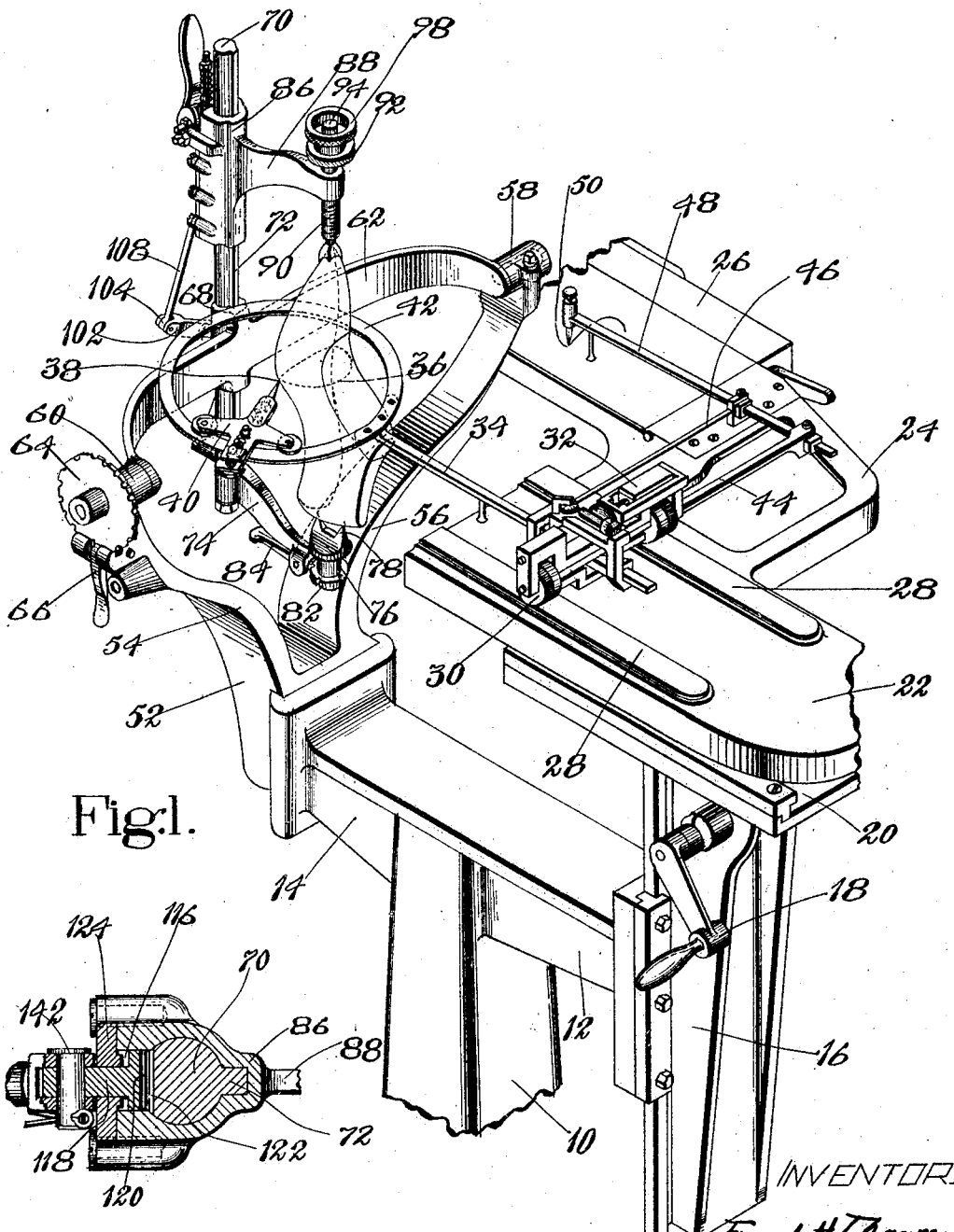

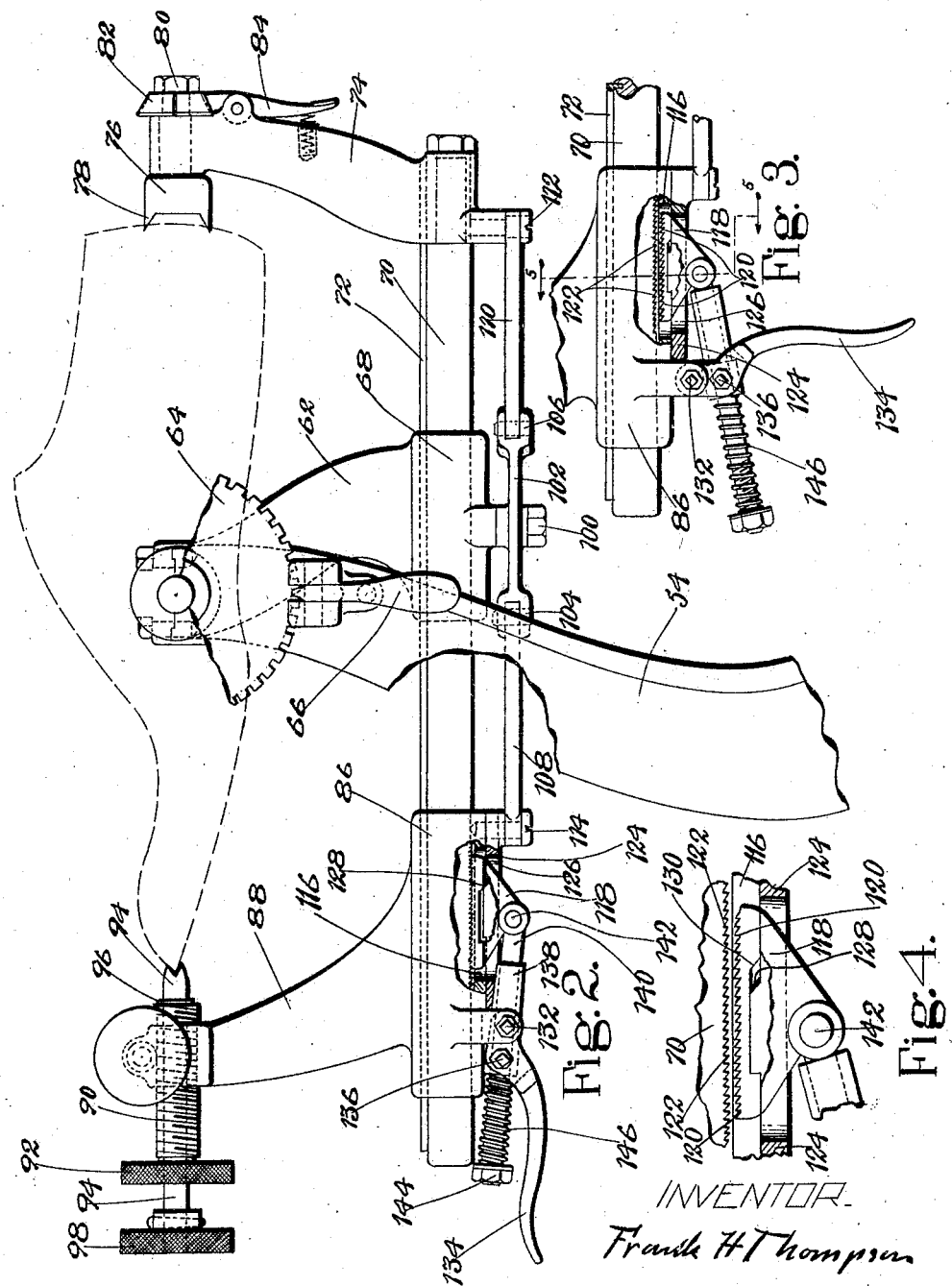

FRANK H. THOMPSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

LAST-MEASURING MACHINE.

1,395,310.  Specification of Letters Patent.  Patented Nov. 1, 1921.

Application filed January 17, 1920. Serial No. 352,091.

*To all whom it may concern:*

Be it known that I, FRANK H. THOMPSON, a citizen of the United States, residing at Beverly, in the county of Essex and State of Massachusetts, have invented certain Improvements in Last-Measuring Machines, of which the following description, in connection with the accompanying drawings, is a specification, like reference characters on the drawings indicating like parts in the several figures.

This invention relates to machines for measuring bodies and more particularly for measuring areas of inaccessible sections of solid or semi-solid bodies. It is herein disclosed with particular reference to measuring sectional areas of shoe lasts, and while the invention, as will later appear, has special adaptation in this connection, it is not restricted thereto, but may be used advantageously to measure sectional areas of other solid or semi-solid bodies.

In designing shoe lasts, it has been the usual practice heretofore, to secure linear and girth or perimeter measurements at different portions of the last, but such measurements give no information about the shape or area of the measured sections nor the "foot room" provided by the lasts, and planimetrical measurements have been possible only by cutting the lasts on the sections to be measured, thereby destroying the lasts.

The inventions of John J. Heys, John B. Hadaway, and R. F. Knight, which form, respectively, the subjects of applications for Patent Ser. No. 117,910, filed August 31, 1916, Ser. No. 254,413, filed Sept. 17, 1918, and Ser. No. 269,327, filed Jan. 2, 1919, provide for the first time machines and methods for making planimetrical measurements without cutting through the last or other body on the plane of section to be measured. In the use thereof, sectional areas may be readily measured transversely of the length of the last, and information be secured for the determination of the shape of the last on such sections. It is frequently desirable, however, to secure planimetrical measurements on planes of section extending diagonally of the length of the last as well as transversely thereof. For example, it may be desirable at times to measure sectional areas in planes extending in various directions through the last as, for instance, through the heel and instep, or through the instep and arch, or about the ankle, all of which information may be required in the development of a last providing proper foot room.

An important feature of the invention consists of means for adjusting the body or last holding means into different angular relations to the plane of movement of the tracer point of the planimeter, so that areas of sections on planes at any desired angle to the body or last may be measured. This feature of the invention may be carried into effect by mounting the body or last between supports or centers with permissive movement relative to the plane of movement of the tracer point about an axis preferably extending intermediate the limits of the body. To secure and maintain the parts in any angular adjusted position relative to the plane of movement of the tracer point, while the body or last is being measured, the invention provides a lock which may be operated at will to permit ready adjustment.

A further feature of the invention consists of a frame carrying the supports for the body or last and mounted for movement across the plane of movement of the tracer point so that by simple adjustment of the frame, the body of last between the supports may be presented at any desired angle to the plane of tracer point movement.

Where the sectional areas of a last are to be measured, it is convenient to support the last between a toe support and a heel support, and to facilitate placing a last in and taking it out of the machine, an important phase of the present invention consists in means for readily moving the heel and toe supports relatively in directions of approach and separation. This feature of the invention is conveniently associated with a manually movable device which serves to impart relative movements to the toe and heel supports and lock them in last holding position.

The above and other novel features of the invention and combinations of parts will be hereinafter described in connection with the form or embodiment thereof illustrated in the accompanying drawings, but the invention is not restricted thereto and may be variously modified within the scope thereof, as will be described by the claims.

In the drawings:

Figure 1 is a perspective view showing the general arrangement of the machine.

Fig. 2 is an enlarged side elevation with some parts broken away showing more particularly the supports or centers for the body or last and the manner of their adjustment, the last being rotated into a horizontal position.

Fig. 3 is a detail showing the lock for holding the supports or centers in adjusted position with a body or last between them.

Fig. 4 is a detail of a clutch; and

Fig. 5 is a cross-section on the line 5—5 of Fig. 3.

The planimeter and the support for the body or last may be associated in operative relation upon a suitable base, or otherwise as convenience may dictate, and as indicated in Fig. 1 the column 10 may serve as a convenient means for this purpose. An ordinary commercially obtainable rolling planimeter is shown but any desired mechanical integrator may be used. The column 10 has two branching arms 12 and 14. At the end of the arm 12 is a vertical slide 16 operated by a handle 18 through any convenient mechanism not shown. The slide 16 carries a horizontal slideway 20 at its upper end, in which can be adjusted the table 22. In the present construction the table 22 has a side extending arm or bracket 24 carrying a flat surface 26 for holding a piece of paper or the like. The table 22 is provided with the tracks 28 on which travel the rolls 30 of a planimeter 32. The recording mechanism of the instrument shown is caused to operate by carrying the end of its tracer arm 34 around the area which it is desired to measure, which, in this instance, is shown as the cross section of a last at 36. The tracer point of the planimeter in the illustrated construction is located at 38 at the end of a carrier 40 arranged to roll around a circular track 42 mounted on the end of the tracer arm 34, in such manner that the point 38 is always at the center of the circle to the movement of which point the registering mechanism of the planimeter is adjusted to correspond. This tracer arm construction, which is the invention of R. F. Knight and need not therefore be further described, enables the tracer point to be carried continuously about the body or last while in contact with the surface thereof.

An arm 44 is rigidly mounted on the planimeter frame, and a parallel arm 46 is pivoted to the tracer arm 34. An arm 48, parallel to the arm 34, is pivoted to the arms 44 and 46, and its length is made preferably equal to the length of the tracer arm. A pencil 50, at its end, will then draw the outline traversed by the tracer point 38, the apparatus just described forming a pantagraph with its reproduction ratio equal to unity.

A body or last to be measured is required to be presented to the tracer point of the planimeter and supported in fixed position while the tracer point moves over the surface of the body or last. To secure many of the measurements required in ascertaining the foot room produced by any last, it is necessary that the body or last be presented to the tracer point of the planimeter at a variety of angles to the plane of movement of the tracer point from perpendicularity to parallelism. A good practical form of the invention with respect to the presentation of the body or last in any desired angle to the plane of movement of the tracer point will now be described.

Secured to the arm 14 is the supporting head 52 having the outspreading supporting arms 54 and 56, the upper end portions of which are provided with bearings 58, 60 in which are mounted the supporting pins or journals of a frame 62 carrying the body or last supporting means. One of the journals or pins of the frame 62 may be provided with suitable means for locking the frame in position to which it may be moved upon its supporting axes. In the present instance of the invention, as indicated in Fig. 2, a toothed wheel 64 is secured to the pin or journal by suitable means, and mounted upon the supporting arm 54 adjacent thereto is a suitable catch 66 for engaging the teeth of the toothed wheel 64. A spring normally acts upon the catch 66 to throw it into locking position and permits the catch to be disengaged from the teeth of the wheel 64 by inward pressure upon the catch as will be clear from Fig. 1.

The frame 62 is preferably formed as a yoke which presents a convenient character of frame for sustaining the body or last supporting means in such position that the body or last may be presented to the tracer point of the planimeter without interference. The frame or yoke 62 is provided with a slideway 68 in which is mounted the slide 70 having extending longitudinally thereof a rib 72 which engages a correspondingly formed groove in the slideway 68, the construction being such that while the rod or member 70 may be moved longitudinally in the slideway, its movement is confined to a rectilinear path and it is held from rotation. The rod or member 70 carries the supports or centers between which the body or last is supported. In the present instance it has secured to one end thereof the supporting arm 74 carrying the support or center 76 for engaging the body or last. The support or center 76 may be variously contrived but in the present instance of the invention, as indicated in Figs. 1 and 2, it consists of a head portion provided with the engaging prongs 78 and a shank portion 80 which extends through a bearing in the supporting arm 74. On the exterior end portion of the shank portion 80 is a notched member or disk 82, the notches of which are adapted to be engaged by a locking device 84 to restrain rotative movement of the support or center 76. When the center 76 has been rotated to desired position, it may be locked in such position by engagement of the catch or lock 84 with one of the notches in the member 82.

The support 74 is secured rigidly to the rod or member 70 by appropriate means.

Mounted on the rod or member 70 at the opposite side of the bearing 68 is the other supporting member for the body or last which comprises, in the present instance, a sleeve 86, movable longitudinally upon the member 70 and splined thereto to prevent relative rotative movement. Extending from the sleeve 86 is the supporting arm 88 through the end of which is threaded the adjusting member 90 having a milled head 92 by which it may be rotated. Extending through the adjusting member 90 is the rotatable support 94, the end of which may preferably be bifurcated or notched to better and more securely engage and hold the toe end of a last. A suitable collar 96 on the support 94 engages the end of the adjusting screw 90, and a hand wheel 98 affords means for rotating the support 58. This construction affords a convenient means for engaging the toe end of a last but it may be variously contrived, as in the machine of the Heys application hereinbefore mentioned.

In placing a body or last in the machine to be measured, it is desirable that the supports or centers which hold the body or last during the measuring operation shall be readily movable toward and from each other, and such movement should have a considerable range on account of the varying sizes of lasts which it may be desired to measure. As a good form of means to this end the guide 68 has pivoted thereto at 100 an arm 102, the opposite ends of which are connected at 104 and 106 to links 108 and 110, respectively. The end of the link 110 is connected at 112 to a lug secured to the support 74, and the end of the link 108 at 114 is connected to the sleeve 86, the construction being such that should the link system be actuated, as by turning the rocking member 102 upon its pivotal mounting, the supports or centers for the body or last would be moved toward and from each other, the member 70 moving with the supporting arm 74 and the sleeve 86 of the supporting arm 88 moving on the rod or member 39.

When the body or last, as indicated in Figs. 1 and 2, is placed between the supports or centers 78 and 94, it is desirable that the centers, after being moved into engagement with the body or last, shall be forcibly moved toward each other to cause them to take positive hold of the body or last and that then the parts should be locked in their supporting position. Various means may be contrived to this end but in the present instance of the invention the sleeve 86 is provided with an opening 116, into which loosely extends a locking member 118 provided with a toothed portion 120, the teeth of which are adapted to engage with a series of teeth 122 which may be appropriately formed on the bar or member 70. Secured to the sleeve 86 is the cap piece 124 which may be appropriately provided with an opening 126 for the accommodation of the locking member 118 and whose inner surface may serve as a supporting slideway for the locking member, which is wider than the opening 126. The cap 124 has an interior inwardly extending cam portion 128, and the toothed portion 120 of the locking member has a complemental outwardly extending cam portion 130, the construction being such that upon movement of the locking member 118 and its toothed portion 120, relatively to the sleeve 86, or leftward, Figs. 2 and 3, the cam or incline 130 will ride up on the cam 128 and cause the teeth of the locking member to engage with the teeth 122 of the bar or member 70.

Pivotally mounted at 132 on a lug extending from the sleeve 86 is the hand piece 134 having pivotally connected thereto at 136 a sleeve 138. Extending through the sleeve 138 is a rod 140 pivotally connected at 142 to the locking member 118, and between the sleeve 136 and a suitable abutment or nut 144 on the end of the rod 140, there is interposed a spring 146, the construction being such that with the parts in position, as indicated in Fig. 3, and the sleeve 86 free for movement on the bar or member 70, if the hand piece 134 is turned clockwise from the position indicated in Fig. 3 to that of Fig. 2, it will first cause the locking member 118 to ride up the cam 128 and interengage the teeth 120 with the teeth 122 on the bar or member 70. Continued clockwise movement of the hand piece 134 into the position indicated in Fig. 2 will cause a relative movement between the sleeve 86 and the bar 70. The member 118 and bar 70 move in unison to the left (Fig. 2) and the sleeve 86 moves to the right, the member 118 sliding upon the cap 124 upon the high parts of the cams. The rocker arm 102, being pivoted on the frame 62, will always keep the two arms 74 and 88 equally spaced above and below the frame 62, the bar 70 sliding freely in the guide 68 to permit this. When the last has been firmly gripped between the dogs, further movement necessary to permit the hand piece 134 to reach its limiting position will be absorbed by the spring 146. At this time the pivot 136 will have been carried past the line joining the pivots 132 and 142, so as to hold the parts in the assumed position, as indicated in Fig. 2. The tension of the spring 146 may, of course, be varied to suit the conditions of use and this may be conveniently effected by a threaded connection between the rod 140 and the nut 144.

In operation, the body or last, the sectional areas of which are to be measured, is placed between the supports or centers 94 and 76 and the centers are then rapidly moved toward each other until they contact with the ends of the body or last. The hand piece 134 is then manipulated by the attendant whereupon the teeth of the locking device 118 engage the teeth 122 of the bar or member 70, and upon further manipulation of the hand piece 134 into the position indicated in Fig. 2, the supports or centers are pressed yieldingly toward each other to effectively and yieldingly hold the body or last between them. The body or last now being held by the supporting means, such supporting means may be moved into different positions to present the body or last at different inclinations to the plane of movement of the tracer point with the result that sections may be taken through the body or last at any desired angle. In carrying this characteristic operation into effect, the attendant may disengage the catch 66 from the toothed wheel 64 and swing the frame or yoke 62 into the desired angular position and then lock it by the catch 66 in order to present the last for the measuring operation. In this manner sections of a last may be taken transversely, as indicated in Fig. 1, or they may be taken at any angular relation to such position, as, for instance, through the heel and instep, through the ankle portion of the last, or, in fact, in substantially any position desired. The frame or yoke 62 is so constructed and arranged with respect to the supporting head that it may be swung completely around in order to present the last in any desired angular relation to the plane of movement of the tracer point. The relative vertical adjustment of the last holding mechanism and the planimeter in order that a group of parallel sections between the toe and heel can be measured, or to permit any desired part of the last to be reached, is permitted by the slide 16—18.

Having described my invention, what I claim as new and desire to secure by Letters Patent of the United States is:—

1. In a machine of the class described, the combination of means for holding a body in position to be measured, and a planimeter having a tracer point movable in a plane over the exterior surface of the body, the body holding means being adjustable perpendicularly and angularly relatively to the plane of movement of the tracer point.

2. In a machine of the class described, the combination of supports for a body to be measured, a planimeter having a tracer point movable in a plane over the surface of the body, and means for holding the body and moving it into different translational and angular relations to the plane of movement of the tracer point whereby any cross sectional area of the body may be measured.

3. In a machine of the class described, the combination of supporting centers for holding a body in position while it is being measured, an integrator including a tracer point movable in a plane over the complete perimeter of a section of the body to measure the area thereof, and means for supporting said centers for adjustment about an axis parallel to the plane of movement of the tracer point that the body may be held in position for measurement of sections at different angles.

4. In a machine of the class described, the combination of supporting centers for holding a body in position while being measured, and a planimeter, the tracer point of which is movable in a plane intersecting the body held between the centers, there being provision for moving the centers perpendicularly to the plane of movement of the tracer point.

5. In a machine of the class described, the combination of centers for holding a body in position to be measured, a planimeter having a tracer point movable in a plane over the exterior surface of the body, and a support for said centers, the support being adjustably mounted to present the body to be measured in different angular and distance relations to the plane of movement of the tracer point.

6. In a machine of the class described, the combination of a yoke, supports carried by the yoke for holding a body to be measured, a planimeter having a tracer point movable over the complete periphery of the body to measure the area of a plane cross-section thereof, and means adjustably holding the yoke to present the body in different angular positions relative to the plane of movement of the tracer point.

7. In a machine of the class described, the combination of centers for holding a last to be measured, a swinging frame carrying said centers, and a planimeter having a tracer point movable in a plane over the exterior surface of the body, the frame being adjustable translationally and angularly relatively to the plane of movement of the tracer point to permit the measurement of systems of parallel sections having any desired angle with the axis of the last.

8. In a machine of the class described, the combination of centers for holding a body to be measured, a planimeter having a tracer point movable in a plane over the surface of a body held between the centers, there being provision for simultaneously adjusting the centers to place the body in different distance and angular relations to the plane of movement of the tracer point.

9. In a machine of the class described, the combination of centers for holding a body to be measured and rotatably mounted to permit the body to be turned about an axis, a planimeter having a tracer point movable in a plane over the surface of a body held between the centers, there being provision for simultaneously adjusting the centers to place the body in different distance and angular relations to the plane of movement of the tracer point.

10. In a machine of the class described, the combination of means for holding a body in position to be measured, an integrator including a tracer point movable in a plane over the surface of a body held by said means, and a supporting frame for said holding means adjustable about an axis intermediate the holding means to present the body in different angular relations to the plane of tracer point movement, there being also provision for relative translational adjustment between the integrator and the holding means to bring the measured section into a desired part of the body.

11. In a machine of the class described, the combination of a planimeter having a tracer point, and supports for engaging opposite parts of a body, portions of which, between the parts, are to be measured, the supports being adjustable translationally and angularly relatively to the planimeter to place the body in different positions with respect to the plane of tracer point movement.

12. A support for holding a last to be measured, comprising, in combination, two centers for engaging opposite portions of the last, means for simultaneously moving said centers toward and from each other to engage and release a last, and means for resiliently holding the centers under pressure in adjusted relation when a last has been engaged by the centers.

13. A support for holding a last to be measured, comprising, in combination, centers for engaging opposite portions of a last, means for moving said centers uniformly and simultaneously toward each other to engage resiliently opposite portions of a last, a frame carrying said centers, and means for adjusting the frame to present the last in differently inclined positions.

14. A support for holding a last, comprising, in combination, centers for engaging opposite portions of a last, and a toggle mechanism for moving the centers relatively in a direction of approach to engage a last between them and then acting yieldingly to clamp the last.

15. In a machine of the class described, the combination of supports for engaging the toe and heel portions of a last sectional areas of which are to be measured, and a planimeter having a tracer point movable in a plane over the surface of the last, the toe and heel supports being adjustable for presenting the last in different distance and angular relations to the plane of movement of the tracer point.

16. In a machine of the class described, the combination of supports for engaging the toe and heel portions of a last, sectional areas of which are to be measured, and a planimeter having a tracer point movable in a plane over the surface of the last, the toe and heel engaging supports being mounted to swing and move translationally in a plane intersecting the plane of movement of the tracer point that sections of the last may be taken at different angles anywhere in the last.

17. In a machine of the class described, a frame mounted for rotation about an axis, two dogs carried by the frame and arranged for simultaneous equal movements of approach and separation perpendicularly toward and from the said axis to grip between them a body to be measured, and a mechanical integrator arranged to operate over the periphery of a plane section of the body, there being also provision for relative adjustment of the integrator and the body perpendicularly to the plane of measurement of the integrator, whereby a section of the body at any angle and in any location may be measured by the integrator.

In testimony whereof I have signed my name to this specification.

FRANK H. THOMPSON.